United States Patent
Hugot

(10) Patent No.: US 11,271,922 B2
(45) Date of Patent: Mar. 8, 2022

(54) METHOD FOR AUTHENTICATING A USER AND CORRESPONDING DEVICE, FIRST AND SECOND SERVERS AND SYSTEM

(71) Applicant: THALES DIS FRANCE SA, Meudon (FR)

(72) Inventor: Didier Hugot, Gemenos (FR)

(73) Assignee: THALES DIS FRANCE SAS, Meudon (FR)

(*) Notice: Subject to any disclaimer, the term of this patent is extended or adjusted under 35 U.S.C. 154(b) by 384 days.

(21) Appl. No.: 16/488,027

(22) PCT Filed: Mar. 16, 2018

(86) PCT No.: PCT/EP2018/056739
§ 371 (c)(1),
(2) Date: Aug. 22, 2019

(87) PCT Pub. No.: WO2018/167298
PCT Pub. Date: Sep. 20, 2018

(65) Prior Publication Data
US 2020/0067904 A1    Feb. 27, 2020

(30) Foreign Application Priority Data
Mar. 17, 2017    (EP) .................................... 17305292

(51) Int. Cl.
*H04L 9/00*      (2006.01)
*H04L 29/06*     (2006.01)
*G06F 21/31*     (2013.01)

(52) U.S. Cl.
CPC .......... *H04L 63/0807* (2013.01); *G06F 21/31* (2013.01); *H04L 63/083* (2013.01); *H04L 63/0853* (2013.01)

(58) Field of Classification Search
CPC .............. H04L 63/0807; H04L 63/083; H04L 63/0853; H04L 63/0838; G06F 21/31; G06F 21/6254
(Continued)

(56) References Cited

U.S. PATENT DOCUMENTS 10,699,268 B2 * 6/2020 Hugot .................. G06Q 20/425
10,841,276 B2 * 11/2020 Hugot ................. H04L 61/1552
(Continued)

FOREIGN PATENT DOCUMENTS

EP        2001202 A1 * 12/2008 ............. H04L 67/12

OTHER PUBLICATIONS

International Search Report (PCT/ISA/210) dated Apr. 6, 2018, by the European Patent Office as the International Searching Authority for International Application No. PCT/EP2018/056739.
(Continued)

*Primary Examiner* — Jeffrey C Pwu
*Assistant Examiner* — Nega Woldemariam
(74) *Attorney, Agent, or Firm* — Marc Boillot; Thales DIS CPL USA, Inc

(57) ABSTRACT

A first server receives from a device(s) an identifier, retrieves a reference credential(s) associated with the identifier(s), generates a reference token(s) using the reference credential(s) and a predetermined key(s) and sends to a second server the reference token(s) and a script(s) for requesting the user to provide a credential(s). The second server gets a device identifier(s) and sends to the device a request(s) by executing the script(s). The device gets a submitted credential(s), generates and sends to the second server a submitted token generated by using the submitted credential(s) and the predetermined key(s) stored by the device. The second server compares each of the submitted token(s) to the received reference token(s) and generates and
(Continued)

sends to the first server a comparison and/or an authentication result(s). The invention also relates to corresponding device, first and second server and system.

7 Claims, 2 Drawing Sheets

(58) Field of Classification Search
USPC .......................................................... 726/9
See application file for complete search history.

(56) References Cited

U.S. PATENT DOCUMENTS

| | | | |
|---|---|---|---|
| 10,963,167 B2* | 3/2021 | Hugot | .................... G06F 21/604 |
| 2005/0074126 A1 | 4/2005 | Stanko | |
| 2007/0044143 A1 | 2/2007 | Zhu et al. | |
| 2014/0351911 A1* | 11/2014 | Yang | ................... H04L 63/0807 |
| | | | 726/7 |
| 2015/0349958 A1* | 12/2015 | Lindell | ................. H04L 9/3228 |
| | | | 713/168 |
| 2016/0085962 A1* | 3/2016 | Sokolov | .................. G06F 21/31 |
| | | | 726/6 |
| 2016/0134599 A1* | 5/2016 | Ross | ....................... H04L 63/08 |
| | | | 713/168 |
| 2016/0259936 A1* | 9/2016 | Mukherjee | .............. G06F 21/41 |
| 2017/0012951 A1* | 1/2017 | Mennes | ................. H04L 63/06 |
| 2017/0032111 A1 | 2/2017 | Johansson et al. | |
| 2017/0195316 A1* | 7/2017 | Murdoch | ............ H04L 63/0838 |
| 2017/0257363 A1* | 9/2017 | Franke | ................ H04W 12/068 |
| 2018/0159840 A1* | 6/2018 | Hau | ....................... H04L 63/08 |
| 2020/0067904 A1* | 2/2020 | Hugot | ................. H04L 63/0807 |

OTHER PUBLICATIONS

Written Opinion (PCT/ISA/237) dated Apr. 6, 2018, by the European Patent Office as the International Searching Authority for International Application No. PCT/EP2018/056739.

* cited by examiner

METHOD FOR AUTHENTICATING A USER AND CORRESPONDING DEVICE, FIRST AND SECOND SERVERS AND SYSTEM

FIELD OF THE INVENTION

The invention relates generally to a method for authenticating a user.

Furthermore, the invention pertains to a device for authenticating a user.

The present invention is notably applicable to a mobile radio-communication field in which the device is a mobile terminal, like e.g., a mobile (tele)phone.

Moreover, the invention also relates to a first and a second server for authenticating a user.

Finally, the invention concerns a system for authenticating a user. The system includes one or several devices and two or more servers.

STATE OF THE ART

US 20050074126 A1 describes a technique in which an authentication server authenticates a client user. To authenticate the client user, the server compares a credential received from the client and belonging to the client user to the credentials belonging to the user and stored in a directory. When the server authenticates successfully the user, the server sends to the client a forwardable ticket and a Ticket-Granting-Ticket (or TGT). The client sends the ticket to the server which redirects the ticket to a delegate server and keeps the TGT, as a cookie.

US 20070044143 A1 discloses a solution in which a client uses authentication servers to request authenticated communication with a service provider. The client sends to the service provider an authentication request. The request includes its unique identifier and an encrypted authentication token received from the authentication servers. The token includes the unique identifier, a network address and a nonce. Each authentication server used a split key received from the service provider to encrypt and generate a partial authentication token. The service provider uses a secret key to decrypt the encrypted authentication token and get the authentication token information. The service provider uses the authentication token information and the unique identifier to decide whether the authenticated communication is authorized.

As known per se, a user of a mobile phone enters her/his user credentials to access a service(s), like e.g., a bank service(s), managed by a remote server. The user credentials are thus submitted to the server that authenticates successfully the user when the submitted user credentials match reference user credentials.

However, such an authentication server has to register or access the reference user credentials, so as to authenticate a plurality of users.

There is a need of an alternative solution while authenticating securely users at a server side.

SUMMARY OF THE INVENTION

The invention proposes a solution for satisfying the just herein above specified need by providing a method for authenticating a user.

According to the invention, the method comprises the following steps. A first server receives from at least one device at least one identifier relating to a user. The first server retrieves at least one reference user credential associated with the at least one user identifier. The first server generates at least one reference authentication token, the at least one reference authentication token being generated based upon the at least one reference user credential and at least one predetermined key. The first server sends to a second server the at least one reference authentication token and at least one script for requesting the user to provide at least one user credential. The second server gets at least one identifier relating to a device to be addressed. The second server sends, based on the at least one identifier relating to the device to be addressed, to the device at least one request for getting at least one user credential by executing the at least one script for requesting the user to provide at least one user credential. The device gets from the user at least one submitted user credential. The device generates and sends to the second server at least one submitted authentication token, the at least one submitted authentication token being generated based upon the at least one submitted user credential and the at least one predetermined key. The device stores the at least one predetermined key. The second server compares each of the at least one submitted authentication token to the received reference authentication token and generates at least one comparison result and/or an authentication result. The second server sends to the first server the at least one comparison result and/or the authentication result.

The principle of the invention consists in using a first server to identify a user, to access her/his reference credential(s) and to generate a reference authentication token(s) on the basis of the reference user credential(s) and a predetermined key(s). Then, the first server transmits the reference authentication token(s) to an identified second server. The first server instructs, through the second server, to a device user to provide her/his credential(s). The device generates a submitted authentication token(s) on the basis of the provided user credential(s) and the predetermined key(s) stored by the device. Then, the device transmits to the second server the submitted authentication token(s). The second server compares the submitted authentication token(s) with respect to the received reference authentication token(s). The second server transmits to the first server a comparison result(s) and/or an authentication result, like e.g., a status relating to either a successful or an unsuccessful user authentication, generated by the second server.

Only the first server accesses registered reference user credentials and the second server does process only tokens, as enciphered data originating from both the first server and the user device, so as to authenticate (or not) a registered user. The second server does therefore not process data in plain text, securing thus access to the processed data by not revealing neither the concerned user nor her/his reference credential(s).

The first and second servers cooperate to authenticate, in a secure manner, users that are known to the first server without needing that the second server accesses neither the concerned user identities (or identifiers) nor their associated reference user credentials.

If a first company manages the first server while a second company manages the second server, then the user identities and the corresponding reference user credentials are not known at the second server side. The second server keeps therefore a privacy of the concerned users that are identified only at the first server side.

The claimed solution allows authenticating securely users without needing any access to corresponding reference user credentials from the second server, as a (token) authentication server.

At the user device side, the users may use their usual associated user credentials.

The invention solution is therefore transparent to the user while remaining secure.

Thus, the invention solution allows accessing securely a service(s) managed by or through the first server while authenticating securely a concerned user through the second server, as an authentication server.

According to an additional aspect, the invention is a device for authenticating a user.

According to the invention, the device is configured to receive from a second server at least one request for getting at least one user credential, get from the user at least one submitted user credential and generate and send to the second server at least one submitted authentication token. The at least one submitted authentication token is generated based upon the at least one submitted user credential and at least one predetermined key. The device stores the at least one predetermined key.

The device may be a user terminal, a Secure Element (or SE) or any kind of communicating device.

Within the present description, an SE is a smart object that includes a chip(s) that protect(s), as a tamper resistant component(s), access to stored data and that is intended to communicate data with an SE host device, like e.g., a mobile phone.

According to a further aspect, the invention is a first server for authenticating a user.

According to the invention, the first server is configured to receive from at least one device at least one identifier relating to a user, retrieve at least one reference user credential associated with the at least one user identifier, generate at least one reference authentication token. The at least one reference authentication token is generated based upon the at least one reference user credential and at least one predetermined key. The first server is configured to send to a second server the at least one reference authentication token and at least one script for requesting the user to provide at least one user credential and receive from the second server at least one comparison result and/or an authentication result.

A service provider (or another third party) that operates the first server, as a (token) authentication delegation server, accesses user identities (or identifiers) and associated reference user credentials, while being able to authenticate in cooperation with the second server the concerned users.

According to still a further aspect, the invention is a second server for authenticating a user.

According to the invention, the second server is configured to receive from a first server at least one reference authentication token and at least one script for requesting the user to provide at least one user credential. The second server is configured to get at least one identifier relating to a device to be addressed. The second server is configured to send, based on the at least one identifier relating to the device to be addressed, to the device at least one request for getting at least one user credential by executing the at least one script for requesting the user to provide at least one user credential. The second server is configured to receive from the device at least one submitted authentication token. The second server is configured to compare each of the at least one submitted authentication token to the received reference authentication token, generate at least one comparison result and/or an authentication result, and send to the first server the at least one comparison result and/or the authentication result.

A service provider (or another third party) that operates the second server, as a (token) authentication server, does not need to access any reference user credentials, while being able to authenticate in cooperation with the first server users unknown to the second server.

According to still a further aspect, the invention is a system for authenticating a user.

According to the invention, the system includes at least one device, a first server and at least one second server. The first server is configured to receive from the at least one device at least one identifier relating to a user, retrieve at least one reference user credential associated with the at least one user identifier, generate at least one reference authentication token. The at least one reference authentication token is generated based upon the at least one reference user credential and at least one predetermined key. The first server is configured to send to a second server the at least one reference authentication token and at least one script for requesting the user to provide at least one user credential. The second server is configured to get at least one identifier relating to a device to be addressed. The second server is configured to send, based on the at least one identifier relating to the device to be addressed, to the device at least one request for getting at least one user credential by executing the at least one script for requesting the user to provide at least one user credential. The device is configured to get from the user at least one submitted user credential, generate and send to the second server at least one submitted authentication token. The at least one submitted authentication token is generated based upon the at least one submitted user credential and the at least one predetermined key. The device stores the at least one predetermined key. The second server is configured to compare each of the at least one submitted authentication token to the received reference authentication token, generate at least one comparison result and/or an authentication result, and send to the first server the at least one comparison result and/or the authentication result.

BRIEF DESCRIPTION OF THE DRAWINGS

Additional features and advantages of the invention will be apparent from a detailed description of one preferred embodiment of the invention, given as an indicative and non-limitative example, in conjunction with the following drawings.

DETAILED DESCRIPTION

Herein under is considered a case in which the invention method for authenticating a user is implemented by a mobile terminal comprising or being coupled or connected to an SE, as a device for authenticating a user, and two remote servers.

According to another embodiment (not represented), the invention method for authenticating a user is implemented by a mobile terminal, as a standalone device for authenticating a user, and two servers. In other words, the device does not cooperate with any other device, like e.g., an SE, so as to generate notably a submitted authentication token(s) based on data securely stored within the device and data provided, as user credentials, by a device user. According to such an embodiment, the device for authenticating a user is adapted to perform the functions that are carried out by the SE and that are described infra apart from a secure data storage and a secure generation of a submitted authentication token(s).

The SE may be an incorporated chip, like e.g., an embedded Universal Integrated Circuit Card (or eUICC) or an integrated Universal Integrated Circuit Card (or iUICC), within a terminal, as an SE host device, or a chip that is coupled to the terminal, as an SE host device, and included within a smart card (or another medium). The chip may therefore be fixed to or removable from its host device.

The invention does not impose any constraint as to a kind of the SE type.

As removable SE, it may be a Subscriber Identity Module (or SIM) type card, a Secure Removable Module (or SRM), a smart dongle of the USB (acronym for "Universal Serial Bus") type, a (micro-) Secure Digital (or SD) type card or a Multi-Media type Card (or MMC) or any format card to be coupled to a host device, as a device for authenticating a user.

Naturally, the herein below described embodiment is only for exemplifying purposes and is not considered to reduce the scope of the invention.

Figure 1:
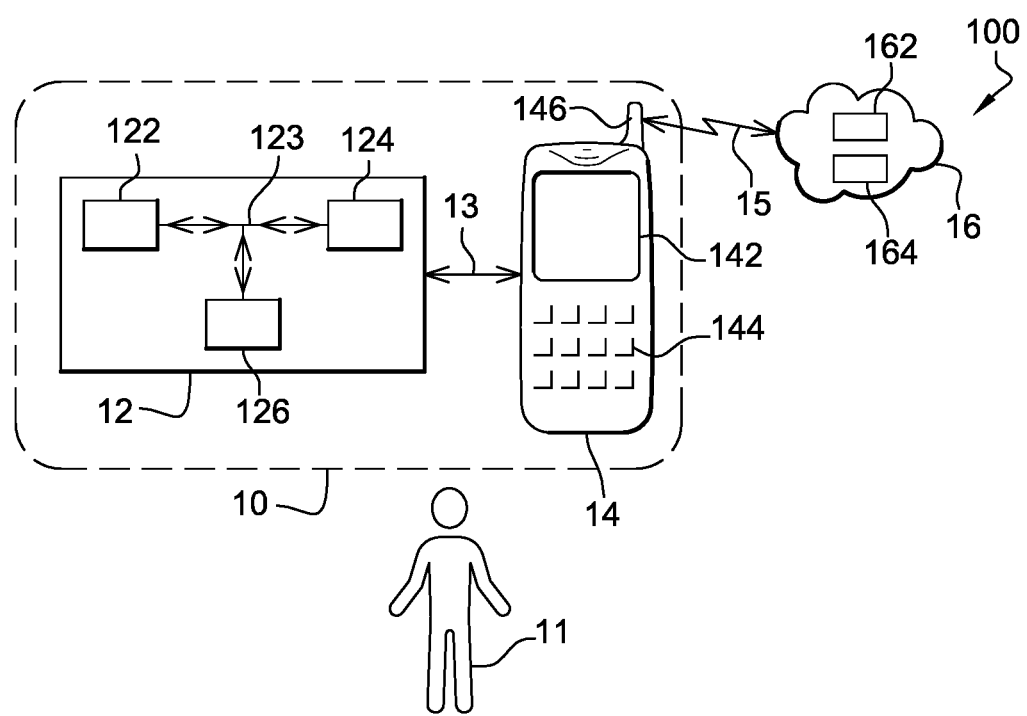
FIG. 1 illustrates a simplified diagram of an embodiment of a system comprising a mobile equipment, a first and a second server, the first server being configured to identify a user, get an associated reference user credential(s), issue, through the device, to the second server a corresponding reference authentication token(s), and let, through the second server, the user submit a user credential(s) and the device issue a corresponding submitted authentication token(s), the second server being adapted to compare the submitted authentication token(s) to the received reference authentication token(s) respectively, according to the invention.

FIG. 1 shows schematically a system 100 including a (mobile) Terminal Equipment (or TE) 10, a first (remote) server 162 and a second (remote) server 164.

The first 162 and second 164 servers are accessible, Over-The-Air (or OTA), Over-The-Internet (or OTI) and/or Over The Cloud (or OTC), over a communication network(s), like e.g., a mobile radio-communication network(s) (not represented), by a fleet of connected devices, like e.g., the TE 10.

The mobile radio-communication network(s) may include a Global System for Mobile Communications (or GSM), a General Packet Radio Service (or GPRS), a Universal Mobile Telecommunications System (or UMTS), an EDGE (acronym for "Enhanced Data Rates for GSM Evolution"), a Code Division Multiple Access (or CDMA) and/or a Long Term Evolution (or LTE) type network(s).

Such a mobile radio-communication network set is not exhaustive but only for exemplifying purposes.

Additionally or alternately, the communication network(s) may include a WLAN (acronym for "Wireless Local Area Network") or an Internet or Intranet type network, that may be accessed through a Short Range (or SR) radio-communication link(s), like e.g., Bluetooth, Wifi, Zigbee, a Near Field Communication (or NFC) type link(s).

The (mobile) (or not) TE 10 includes a (mobile) phone 14 and one or several chips within an SE 12.

The SE chip(s) is(are) incorporated, possibly in a removable manner, within a Printed Circuit Board (or PCB) of the phone 14, as a chip host device.

The chip(s) may also incorporate at least part of the phone component(s), like e.g., a baseband processor, an application processor(s) and/or other electronic component(s).

Alternately, the chip(s) include(s) a Trusted Execution Environment (or TEE), as a secure area of a phone (or terminal) processor and a secured runtime environment.

The chip(s) is(are) preferably included within the SE.

The SE may nevertheless have different form factors.

Instead of being embedded within its host device, the SE chip(s) may be carried by a medium, such as a smart card or a dongle, like e.g., a Universal Serial Bus (or USB) type dongle, and is(are) communicatively coupled or connected to its host device.

The invention does not impose any constraint as to a kind of the SE, when present.

As removable SE, it may be a smart dongle of the USB type, a (micro) Secure Digital (or SD) type card, a Multi-Media type Card (or MMC), a SIM type card or any format card to be coupled to a chip host device.

The SE 12 belongs preferably to a user, as a subscriber to a wireless service(s).

The SE 12 includes one or several chip(s) comprising a (micro)processor(s) 122 (and/or a (micro)controller(s)), as data processing means, a memory(ies) 124, as data storing means, and one or several Input/Output (or I/O) interfaces 126 that are internally all connected, through an internal bidirectional data bus 123, to each other.

The I/O interface(s) 126 allow(s) communicating data from the internal SE chip(s) to the chip exterior and conversely.

The memory 124 stores an Operating System (or OS).

Instead of being included within the phone 14, the (SE) chip is mechanically independent from the phone 14 and included within a medium. The (chip) medium may be a watch or a headset, as an accessory of the phone 14. The medium may be any other wearable device, like e.g., a camera, a clothing, a jewel of the phone user or anything that may accommodate or integrate the chip, which the phone user 11 wears or accesses.

The SE 12 may store an International Mobile Equipment Identity (or IMEI), a Mobile Subscriber Integrated Services Digital Network-number (or MSISDN), an Internet Protocol (or IP) address, an International Mobile Subscriber Identity (or IMSI) and/or an email address(es), as an identifier(s) relating to the SE 12.

The SE 12 may be arranged to receive from the first server 162 one or several reference authentication tokens, one or several identifiers relating to a second server 164 and one or several scripts for requesting the user to provide one or several user credentials.

The SE 12 may be configured to send to the identified second server 164 the reference authentication token(s) and the script(s) for requesting the user to provide one or several user credentials.

The SE 12 is adapted to receive from the second server 164 one or several requests for getting one or several user credentials, to get from the user 11 (the SE 12 and/or the phone 14) one or several provided (or submitted) user credentials.

The SE 12 receives a predetermined key(s).

Instead of receiving the predetermined key(s), the SE 12 is able to generate it (them) by using a key generation algorithm and secret data that are both shared with a server, like e.g., the first server 162 or a server connected to the first server 162.

The SE 12 stores the predetermined key(s) being previously either received or generated on board.

The predetermined key(s) may include a predetermined temporary key or permanent key to be used for generating a corresponding submitted authentication token(s).

Instead of a predetermined temporary key, the SE 12 may use a temporary password, like e.g., a One Time Password (or OTP), by using a temporary password generation algorithm and secret data that are both shared with a server, like e.g., the first server 162 or a server connected to the first server 162.

The thus generated submitted token(s) may be a temporary token(s), like e.g., a One Time token(s), or a permanent token(s).

According to an essential feature of the invention, the SE 12 is adapted to issue one or several submitted (authentication) tokens based on one or several provided (or submitted) user credentials and the predetermined key(s). To generate the submitted token(s), the SE 12 stores the predetermined key(s) and a token generation algorithm that are both shared with a server, like e.g., the first server 162 or a server connected to the first server 162. Once generated, the SE 12 is configured to send to the second server 164 the submitted token(s).

The SE 12 is connected or coupled to the phone 14, as a user terminal.

Instead of a phone 14, the user terminal may be a desktop computer, a laptop computer, a media-player, a game console, a tablet, a netbook, a handset and/or a Personal Digital Assistance (or PDA) that incorporates or cooperates with a baseband (radio) processor(s).

Instead of a phone 14, the user terminal may be any other device including means for processing data, comprising or being connected to Long Range (or LR) and/or SR Radio-Frequency (or RF) communication means for exchanging data with outside, and comprising or being connected to means for storing data.

The phone 14, as a user terminal, is used for accessing the first 162 and second 164 servers.

The phone 14 includes one or several (micro)processors (and/or a (micro)controller(s)) (not represented), as means for processing data, comprising and/or being connected to one or several memories, as means for storing data, comprising or being connected to means for interfacing with a user, as Man Machine Interface (or MMI) and comprising or being connected to an antenna 146 for exchanging data with outside.

The phone MMI may include a display screen(s) 142, a keyboard(s) 144, a loudspeaker and/or a camera (not represented).

The phone MMI is used for presenting information to a phone user 11, like e.g., a message for prompting the user to enter or provide data, as a user credential(s), and for getting data entered or provided by the user.

The user credential(s) is(are) known and/or specific only to the phone user 11.

The phone MMI allows a phone user to interact with the phone 14.

The phone memories may include one or several EEPROMs (acronym for "Electrically Erasable Programmable Read-Only Memory"), one or several ROMs (acronym for "Read Only Memory"), one or several Flash memories, and/or any other memories of different types, like one or several RAMs (acronym for "Random Access Memory").

The antenna 146 allows communicating, through an RF link(s) 15, as a wireless link(s), via the communication network(s), data with the first 162 and second 164 servers.

The RF may be fixed at several hundreds of MHz, e.g., around 850, 900, 1800, 1900 and/or 2100 MHz, as an LR type RF.

Alternately or additionally to the LR type RF, the phone 14 is connected to or include Contact-Less (or CL) communication means for exchanging data with outside, like e.g., via a Wifi-hotspot (not represented), as a Network Access Point (or NAP), with the first 162 and second 164 servers.

Within the present description, the adjective "CL" denotes notably that the communication means communicates via one or several SR type RF links.

The SR type RF link(s) may be related to any CL technology that allows the phone 14 to exchange data, through a CL type link, with the first 162 and second 164 servers. The SR RF may be related to e.g., an NFC, a Wi-Fi, a Bluetooth and/or a Bluetooth Low Energy (or BLE) type communication technology(ies) or the like, as a non-mobile (radio) communication channel(s).

The first server 162 is connected, over the (bi-directional) wireless link(s) 15, to the phone 14.

The first server 162 may be operated by a Mobile Network Operator (or MNO), a Mobile Virtual Network Operator (or MVNO), a bank operator, a service provider or on its behalf.

The first server 162 is used in cooperation with a fleet of (client) devices, like e.g., the phone 14, and the second server 164, so as to authenticate (or not) the device users registered preferably only at the first server 162 side.

The first server 162 is identified by a Uniform Resource Identifier (or URI), like e.g., an Uniform Resource Locator (or URL), an IP address and/or the like, as an identifier(s) relating to the first server 162. The first server identifier(s) may be stored within at the device side (either the device memory or an incorporated or coupled SE memory).

The first server 162 is hosted by a computer including data processing means, like e.g., a processor(s) (not represented), and one or several I/O interfaces for exchanging data with outside.

The first server 162 includes or is connected to a first server memory(ies) (not represented), as data storing means, that stores a first database and one or several identifiers relating to a second server 164 to be used as a token authentication server.

The first server memory stores a URI, a URL, an IP address(es) and/or the like, as an identifier(s) relating to the second server 164 to be involved to authenticate the users registered at the first server 162.

The first server 162 is able to access the first database.

The first database records preferably data relating to a plurality of subscribers or user accounts, as data relating to users.

Each user account is associated with one or several identifiers relating to the user. The user account may be associated with an IMSI(s), a URI(s), a URL(s), an email address(es), an IP address(es), a MSISDN(s) and/or the like, so as to identify uniquely a device(s) to be addressed and used for authenticating the user.

The first server 162 is able to receive, for each user (client), from a device(s), one or several user identifiers and/or one or several identifiers relating to a device(s) to be addressed and used for authenticating the (concerned) user.

The data relating to the users includes, for one or several identifiers relating to each recorded user, one or several reference user credentials.

The reference user credential(s) may include a reference Personal Identity Number (or PIN), a reference password, a reference passphrase, a reference One Time Password (or OTP) and/or one or several reference biometric features, like e.g., a reference fingerprint(s), a reference voice, a reference iris, a reference palm(s), a reference vein(s) and/or a reference face recognition(s) relating to each concerned user.

For a given user, one or several destination devices, like e.g., a phone, a tablet and/or other computer device(s), as a user terminal(s), in an association with one or several SE(s) may be registered within the first database.

The first server 162 (processor) executes preferably one or several security functions, in order to protect access to information managed through or by the first server 162. The security functions include preferably a data encryption by using a public key related to the second server 164, so as to protect access to the concerned encrypted data to be sent to the second server 164. The security functions include preferably a data decryption by using a private key related to the first server 162, so as to access the concerned decrypted data (in plain text). The security functions include preferably a data signature by using a private key related to the first server 162, so as to prove that an originator of data to be sent to the second server 164 is the first server 162.

The first server 162 (processor) is dedicated to running an invention application for authenticating a user.

The first server 162 plays a role of a token authentication delegation server (and not a server that delegates an authentication based on reference user credentials).

The first server 162 is adapted to receive from a source device, like e.g., the phone 14 or a user desktop computer, an identifier(s) relating to a (registered) user.

The first server 162 is configured to retrieve in association with the (identified) user a reference user credential(s).

The first server 162 may be configured to retrieve in association with the user an identifier(s) relating to a reference destination device(s), like e.g., the phone 14. The reference destination device(s) may be the source device(s) (that provide(s) the user identifier(s)) or distinct from the source device(s).

According to an essential invention feature, the first server 162 is arranged to generate, based on the reference user credential(s) and a predetermined key(s) or an OTP(s) or a temporary password(s), a reference (authentication) token(s), as enciphered data relating to the reference user credential(s).

According to a preferred embodiment, the first server 162 is hosted by or connected to a Hardware Security Module (or HSM). The HSM stores the predetermined key(s) (and other keys) and provides, in a secure manner, a crypto-processing service(s), notably to generate a reference (authentication) token(s), based on the predetermined key(s) and a token generation algorithm that the HSM stores.

The predetermined key(s) may include a predetermined temporary key or permanent key to be used to generate a corresponding reference token(s).

Instead of a predetermined temporary key, the first server 162 may use a temporary password, like e.g., an OTP, by using a temporary password generation algorithm and secret data that are both shared with the (client) devices.

The thus generated reference token(s) may be a temporary reference token(s), like e.g., a One Time reference token(s), or a permanent reference token(s).

The first server 162 is preferably adapted to transmit to the source device or a (registered) destination device the reference token(s), one or several (registered) identifiers relating to a second server 164 and one or several scripts for requesting the user to provide or submit one or several user credentials. The script(s) for requesting the user to provide or submit one or several user credentials is(are) intended to the second server 164 that is able to execute such a script(s). The script(s) for requesting the user to provide or submit one or several user credentials is(are) predetermined possibly based on a risk engine while taking into account possibly the (end) user environment, like e.g., the user device, the user location, a nature of the device application, such as a web browser or a mobile application.

The first server 162 is preferably adapted to receive through the user device or directly from the registered second server 164 an authentication result.

The first server 162 is arranged to store (or let store) within the first server memory the authentication result.

The first server 162 authorizes (when the user has been successfully authenticated) or forbids (when the user has not been successfully authenticated) access to a service(s) managed by the first server 162 or another server connected to the first server 162.

The second server 164, as a (token) authentication server, may be operated by a service provider or on its behalf.

The second server 164 is integrated within an entity of a system, as a back-end system.

The second server 164 is hosted by a computer including data processing means, like e.g., a processor(s) (not represented), and one or several I/O interfaces for exchanging data with outside.

The second server 164 includes or is connected to a second server memory(ies) (not represented), as data storing means, that stores a second database.

The second server 164 is able to access the second database.

The second server 164 (processor) executes preferably one or several security functions, in order to protect access to information managed through or by the second server 164. The security functions include preferably a data encryption by using a public key related to the first server 162, so as to protect access to the concerned thus encrypted data. The security functions include preferably a data decryption by using a private key related to the second server 164. The security functions include preferably a data signature by using a private key related to the second server 164, so as to prove that an originator of data (to be sent) is the second server 164.

The second server 164 (processor) is dedicated to running an invention application for authenticating a user.

The second server 164 plays a role of a token authentication server.

The second server 164 is preferably adapted to receive from a (source) device or the first server 162 a reference (authentication) token(s) and one or several scripts for requesting a user to provide one or several user credentials.

The second server 164 may be adapted to receive, in a preferential manner from the first server 162, one or several identifiers relating to a (user) device to be addressed and used for authenticating the concerned user.

The second server 164 is configured to register within the second database in association the (received) reference (authentication) token(s) and the (received) script(s) for requesting the user to provide one or several user credentials.

The second server 164 is adapted to transmit, based on the at least one identifier relating to the device to be addressed, to the (destination) device one or several requests for getting one or several user credentials by executing the script(s) for requesting the user to provide one or several user credentials. The execution, by the second server 164, of the script(s) for requesting the user to provide one or several user credentials creates an authentication message flow that involves the device, the user and the second server 164. The authentication message flow may include e.g., a transmission of a request for getting a PIN (or a password) by the second server 164 to the device followed by a transmission of a request for getting an OTP (or a Fast IDentity Online (or FIDO) type authentication, like e.g., a biometrics feature authentication) by the second server 164 to the device.

The second server 164 is preferably arranged to receive from the device one or several submitted (authentication) token(s).

According to an essential invention feature, the second server 164 is configured to compare each submitted token to a corresponding (registered) reference token. The second server 164 (or another server connected to the second server 164) is configured to analyse whether the submitted token does or does not match the reference token.

The second server 164 is adapted to generate one or several comparison results and/or an authentication result, i.e. a successful or an unsuccessful user authentication status. Only if the submitted token(s) match(es) the reference token(s), the authentication result is set to a successful authentication status, like e.g., "ok". Otherwise, i.e. if the submitted token(s) do(es) not match the reference token(s), the authentication result is set to an unsuccessful authentication status, like e.g., "ko".

The second server 164 is arranged to store (or let store) within the second server memory the comparison result(s) and/or the authentication result.

The second server 164 is preferably configured to send through the (source) device or directly to the first server 162 the comparison result(s) and/or the authentication result.

The second server 164 processes anonymously (i.e. without knowing any user identifier(s)) reference tokens or submitted tokens that originate from reference user credentials or submitted user credentials respectively.

Figure 2:
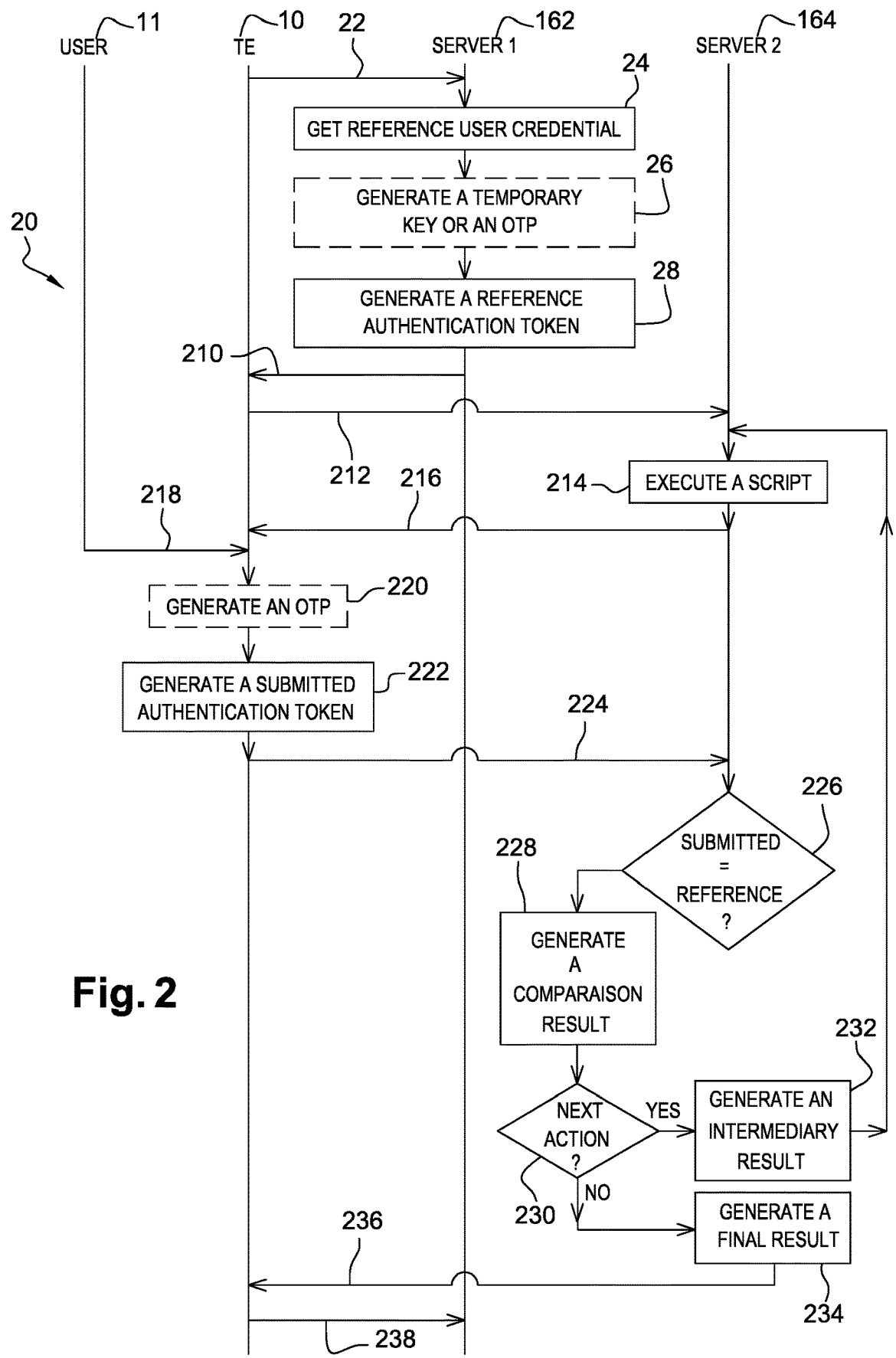
FIG. 2 represents an embodiment of a message flow between the user, the phone, the servers of FIG. 1, so that, further to a user identification and a retrieval of the corresponding reference user credential(s), the first server issues, through the device, to the second server a corresponding reference authentication token(s) to be compared to a token(s) generated by the device using a submitted user credential(s), so that the first server authenticates (or not), according to a comparison and/or authentication result(s) issued by the second server, the user and the device.

FIG. 2 depicts an exemplary embodiment of a message flow 20 that involves the user 11, the TE 10, as a user device, the first server 162, as a token authentication delegation server, and the second server 164, as a token authentication server.

In the described example, it is assumed that the TE user 11 has launched a web browser supported by the phone 14 to request access to the first server 162. Then, the first server 162 requests the TE user 11 to identify, in order to connect to the first server 162. It is further assumed that the TE user 11 is registered at the first server 162 side and has one or two reference user credentials, like e.g., a password or a password and an OTP, so as to authenticate. It is still further assumed that the first server 162 and the second server 164 exchange through the TE 10, as the user device. According to an alternative (not represented), the first and second servers exchange directly, i.e. without passing through the user device.

Initially, the second server 164 sets an intermediary (authentication) result and a final (authentication) result to "1".

The TE user 11 enters, as a user identifier, a user name or an email address by using e.g. the phone MMI.

Alternately or additionally, the TE user 11 enters an MSISDN related to her/his phone 14 and/or an IMSI, as a user device identifier(s), by using e.g. the phone MMI.

It is assumed that the TE 10 exchanges with the first server 162 by using e.g., HyperText Transfer Protocol (or HTTP) or HTTP Secure (or HTTPS) type messages. However, any other data communication protocol between the TE 10 and the first server 162 may be used alternatively or additionally to the HTTP(S) type protocol.

Once the TE user 11 has provided one or several user identifiers, the TE 10 sends to the first server 162 a message 22 including a request for getting access to a service managed by the first server 162 including or being accompanied with the email address, as the user identifier(s), and/or the MSISDN and/or IMSI, as the user device identifier(s).

The message 22 includes preferably a predetermined URL relating to the first server 162, as a particular first server identifier.

The first server 162 may verify (not represented) whether the identified user is or is not authorized to access a thus requested service. If the first server 162 identifies that the user 11 is not authorized to access the service, then the first server 162 denies access to the service and aborts an initiated transaction process. No transaction is thus performed. Otherwise, i.e. only if the first server 162 identifies that the user 11 is authorized to access the service, the first server 162 continues an initiated transaction process.

The first server 162 gets 24 e.g., a reference password, as the reference user credential(s), that is associated with the registered user identifier(s).

Optionally, the first server 162 generates 26 a key that is used either only once or a limited number of times, as a temporary key, or in a permanent manner, as a permanent key by using a key generation algorithm and secret data shared with the TE 10, as a registered user device.

Instead of a generation of a temporary (or a permanent) key, the first server 162 generates 26 an OTP, as a password that is used only once, or a limited number of times, as a temporary password, by using an OTP (or a temporary password) generation algorithm and secret data shared with the TE 10.

The first server 162 accesses the predetermined temporary (or a permanent) key.

The first server 162 generates 28 one (or several) reference authentication token(s) based on e.g., the reference password, as the reference user credential(s), and the predetermined key (or the predetermined OTP or the predetermined temporary password).

Optionally, prior to sending the reference authentication token(s), the first server 162 encrypts the reference authentication token(s) by using a public key relating to the second server 164 and/or signs the reference authentication token(s) by using a private key relating to the first server 162.

The first server 162 sends to the TE 10 a message 210 that includes the (possibly encrypted) reference authentication token(s), a URL relating to the second server 164 and a script(s) for requesting the user to provide one (or several) user credential(s).

Optionally, the message 210 further or another separated message (not represented) includes the predetermined key(s) that has preferably been encrypted by the first server 162 by using a public key relating to the TE 10 (the phone 14 or the SE 12) and/or signed by using a private key relating to the first server 162.

The predetermined key(s) is either unique and valid for the reference authentication token(s) and the submitted authentication token(s) or distinct from each other and each of the predetermined keys is valid for only one of the reference authentication tokens and only one of the submitted authentication tokens.

Then, the TE 10 sends to the (identified) second server 164 a message 212 that includes the (possibly encrypted)

reference authentication token and the script(s) for requesting the user to provide one (or several) user credential(s).

According to an alternative (not represented), instead of the two last messages 210 and 212, the first server 162 sends directly (instead of passing through the TE 10) to the second server 164 a single message that includes the (possibly encrypted) reference authentication token(s) and a script(s) for requesting the user to provide one (or several) user credential(s). Additionally, either in the same message or in a separate message, the first server 162 sends directly to the second server 164 preferably the MSISDN and/or the IMSI, as an identifier(s) relating to the TE 10, so as to identify the TE 10, as the device to be addressed and used for authenticating the user.

The second server 164 gets the TE 10 identifier(s), by receiving from the TE 10 (or the first server 162) the TE 10 identifier(s).

After a possible data decryption and/or a possible (successful) signature verification, the second server 164 stores (not represented) the (received) reference authentication token and the (received) script(s) for requesting the user to provide one (or several) user credential(s).

By executing 214 the (received) script for requesting the user to provide one user credential, the second server 164 sends, based on the MSISDN and/or IMSI, to the TE 10 a message 216 including a request for getting from the user 11 one user credential.

The user 11 enters or provides one submitted user credential.

The TE 10 receives from the user 11 one submitted password 218, as a submitted user credential.

Optionally, the TE 10 generates (not represented) a key that is used either only once or a limited number of times, as a temporary key, or in a permanent manner, as a permanent key by using the key generation algorithm and the secret data shared with the first server 162.

Instead of a generation of a temporary (or a permanent) key, the TE 10 generates 220 an OTP, as a password that is used only once, or a limited number of times, as a temporary password, by using the OTP (or the temporary password) generation algorithm and the secret data shared with the first server 162.

The TE 10 accesses the predetermined (temporary or permanent) key, be it either generated previously onboard or received from the first server 162.

The TE 10 generates 222 a submitted authentication token based on the submitted password, as the submitted user credential, and the predetermined key (or the OTP or the temporary password).

Once generated, the TE 10 sends to the second server 164 a message 224 including the submitted authentication token.

After a possible data decryption and/or a possible (successful) signature verification, the second server 164 stores (not represented) the submitted authentication token.

The second server 164 compares 226 each submitted authentication (received from the TE 10) to a corresponding reference authentication token (received through the TE 10 (or directly) from the first server 162).

The second server 164 generates 228 a comparison result, i.e. a successful or unsuccessful (token) matching, like e.g., a "1" for a successful matching or a "0" for an unsuccessful matching.

The second server 164 stores (not represented) the comparison result.

The second server 164 verifies 230 whether there is or is not another action, i.e. another script for requesting the user to provide e.g., an OTP, as another user credential, to be executed.

If there is another script for requesting the user to provide another user credential to be executed, then the second server 164 generates 232 an intermediary result based on the previously generated comparison result and the previous intermediary result value, i.e. the set intermediary result for the first time. To generate the intermediary result, the second server 164 multiplies the previously generated comparison result by the previous intermediary result value. Thus, as soon as a comparison result is unsuccessful, the intermediary result becomes "0". The second server 164 stores the intermediary result. Then, the second server 164 repeats for each other script:

a script execution 214 with another script for requesting the user to provide e.g., an OTP, as another user credential;
a script transmission 216 with a request to the user to provide e.g., an OTP;
a reception 218 from the user 11 of a submitted OTP;
a generation 222 of a corresponding submitted authentication token;
a transmission of the submitted authentication token 224;
a comparison 226 of the submitted authentication token to a (received) reference authentication token;
a generation 228 of a comparison result;
a verification 230 of an existence of a further action, i.e. a further script, to be executed; and (when there are only two scripts)
a generation 234 of a final result, as an authentication result.

Otherwise, i.e. when there is no other script for requesting the user to provide another user credential to be executed, the second server 164 generates 234 a final result, based on the previous generated comparison result and the previous final result value, i.e. the set final result for the first time. To generate the final result, as an authentication result, the second server 164 multiplies the previously generated comparison result by the previous final result value. The authentication result constitutes a successful or an unsuccessful authentication status, like e.g., a "1" or "0" respectively. The second server 164 stores the authentication result.

Optionally, prior to sending data, like e.g., the comparison result(s) and/or the authentication result, the second server 164 encrypts the data by using a public key relating to the first server 162 and/or signs the data by using a private key relating to the second server 164.

The second server 164 sends to the TE 10 a message 236 including the (possibly encrypted) authentication result (and/or the (possibly encrypted) comparison result(s)).

The TE 10 sends to the first server 162 a message 238 including the (possibly encrypted) authentication result (and/or the (possibly encrypted) comparison result(s)).

According to an alternative (not represented), instead of the two last messages 236 and 238, the second server 164 sends directly (instead of passing through the TE 10) to the first server 162 a single message that includes the (possibly encrypted) authentication result (and/or the (possibly encrypted) comparison result(s)).

The invention solution allows delegating a user authentication from a first server accessing a user credential(s) for each registered user to a second server by transmitting (through a user device) to the second server a corresponding authentication token without needing to impact the user experience (since the user may still use her/his usual user credential(s)).

The invention solution allows carrying out a secure user authentication operation while involving a user device and at least two cooperating servers based on a "tokenization" on the fly of user credential(s) registered and accessible only by the first server and a token authentication by the second server (without any "de-tokenization").

The invention claimed is:

1. A method for authenticating a user, comprising:
receiving, by a first server, from at least one device, at least one identifier relating to a user;
retrieving, by the first server, at least one reference user credential associated with the at least one user identifier;
generating, by the first server, at least one reference authentication token, the at least one reference authentication token being generated based upon the at least one reference user credential and at least one predetermined key;
sending, by the first server, to a second server, at least one identifier relating to a device to be addressed, the at least one reference authentication token and at least one script for requesting the user to provide at least one user credential;
sending, by the second server, to the device, at least one request for getting at least one user credential by executing the at least one script for requesting the user to provide at least one user credential;
getting, by the device, from the user, at least one submitted user credential;
generating and sending, by the device, to the second server, at least one submitted authentication token, the at least one submitted authentication token being generated based upon the at least one submitted user credential and the at least one predetermined key, the device storing the at least one predetermined key;
comparing, by the second server, each of the at least one submitted authentication token to the received reference authentication token and generates at least one comparison result and/or an authentication result;
sending, by the second server, to the first server, the at least one comparison result and/or the authentication result;
wherein, prior to generating the at least one reference authentication token, the first server generates the at least one predetermined key by using a key generation algorithm and secret data, the key generation algorithm and the secret data being shared with the device and, prior to generating the at least one submitted authentication token, the device generates the at least one predetermined key by using the key generation algorithm and the secret data.

2. Method according to claim 1, wherein, prior to generating the at least one reference authentication token, the first server generates and sends to the device the at least one predetermined key.

3. Method according to claim 1, wherein, prior to sending the at least one reference authentication token, the first server encrypts the at least one reference authentication token by using a public key relating to the second server and/or signs the at least one reference authentication token by using a private key relating to the first server and/or, prior to sending the at least one submitted authentication token, the device encrypts the at least one submitted authentication token by using a public key relating to the second server and/or signs the at least one submitted authentication token by using a private key relating to the device.

4. Method according to claim 1, wherein, prior to sending the at least one comparison result and/or the authentication result, the second server encrypts the at least one comparison result and/or the authentication result by using a public key relating to the first server and/or signs the at least one comparison result and/or the authentication result by using a private key relating to the second server.

5. Method according to claim 1, wherein the at least one predetermined key is unique and valid for the at least one reference authentication token and the at least one submitted authentication token or the at least one predetermined key is distinct from each other and each of the at least one predetermined key is valid for only one of the at least one reference authentication token and only one of the at least one submitted authentication token.

6. A system comprising:
a device for authenticating a user,
wherein the device is configured to:
receive from a second server at least one request for getting at least one user credential;
get, from the user, at least one submitted user credential; and
generate and send, to the second server, at least one submitted authentication token, the at least one submitted authentication token being generated based upon the at least one submitted user credential and at least one predetermined key, the device storing the at least one predetermined key;
a first server for authenticating a user,
wherein the first server is configured to:
receive, from at least one device, at least one identifier relating to a user;
retrieve at least one reference user credential associated with the at least one user identifier;
generate at least one reference authentication token, the at least one reference authentication token being generated based upon the at least one reference user credential and at least one predetermined key,;
send, to a second server, at least one identifier relating to a device to be addressed, the at least one reference authentication token and at least one script for requesting the user to provide at least one user credential; and
receive, from the second server, at least one comparison result and/or an authentication result; and a second server for authenticating a user,
wherein the second server is configured to:
receive, from a first server, at least one identifier relating to a device to be addressed, at least one reference authentication token and at least one script for requesting the user to provide at least one user credential;
send, to the device, at least one request for getting at least one user credential by executing the at least one script for requesting the user to provide at least one user credential;
receive, from the device, at least one submitted authentication token;
compare each of the at least one submitted authentication token to the received reference authentication token;
generate at least one comparison result and/or an authentication result; and
send, to the first server, the at least one comparison result and/or the authentication result, wherein, prior to generating the at least one reference authentication token, the first server generates the at least one predetermined key by using a key generation algorithm and secret data, the key generation algorithm and the secret data being shared with the device and, prior to generating the at least one submitted authentication token, the device generates the at least one predetermined key by using the key generation algorithm and the secret data.

7. A system for authenticating a user,
wherein, the system including at least one device, a first server and at least one second server, the first server is configured to:
receive, from the at least one device, at least one identifier relating to a user;
retrieve at least one reference user credential associated with the at least one user identifier;
generate at least one reference authentication token, the at least one reference authentication token being generated based upon the at least one reference user credential and at least one predetermined key;
send, to a second server, at least one identifier relating to a device to be addressed, the at least one reference authentication token and at least one script for requesting the user to provide at least one user credential;
wherein the second server is configured to send, to the device, at least one request for getting at least one user credential by executing the at least one script for requesting the user to provide at least one user credential;
wherein the device is configured to:
get, from the user, at least one submitted user credential;
generate and send, to the second server, at least one submitted authentication token, the at least one submitted authentication token being generated based upon the at least one submitted user credential and the at least one predetermined key, the device storing the at least one predetermined key;
wherein the second server is configured to:
compare each of the at least one submitted authentication token to the received reference authentication token;
generate at least one comparison result and/or an authentication result; and
send, to the first server, the at least one comparison result and/or the authentication result;
wherein, prior to generating the at least one reference authentication token, the first server generates the at least one predetermined key by using a key generation algorithm and secret data, the key generation algorithm and the secret data being shared with the device and, prior to generating the at least one submitted authentication token, the device generates the at least one predetermined key by using the key generation algorithm and the secret data.

\* \* \* \* \*